(12) United States Patent
Tan et al.

(10) Patent No.: US 9,017,167 B2
(45) Date of Patent: Apr. 28, 2015

(54) ERGONOMICALLY CONFIGURABLE GAME CONTROLLER

(75) Inventors: Min-Liang Tan, Singapore (SG); Chern Ann Ng, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 1143 days.

(21) Appl. No.: 11/883,909

(22) PCT Filed: Nov. 10, 2006

(86) PCT No.: PCT/US2006/044024
§ 371 (c)(1),
(2), (4) Date: Dec. 1, 2009

(87) PCT Pub. No.: WO2008/057100
PCT Pub. Date: May 15, 2008

(65) Prior Publication Data
US 2010/0087252 A1    Apr. 8, 2010

(51) Int. Cl.
*A63F 13/24* (2014.01)
*A63F 13/20* (2014.01)

(52) U.S. Cl.
CPC .............. *A63F 13/24* (2014.09); *A63F 13/06* (2013.01); *A63F 2300/1043* (2013.01)

(58) Field of Classification Search
USPC .............................. 273/148 B; 463/36, 37, 38
See application file for complete search history.

(56) References Cited

U.S. PATENT DOCUMENTS

| 5,375,831 | A | | 12/1994 | Hsien-Chung |
| 5,785,317 | A | * | 7/1998 | Sasaki ....................... 273/148 B |
| 6,288,706 | B1 | * | 9/2001 | Leman ........................ 345/168 |
| 6,422,944 | B1 | | 7/2002 | Naghi |
| 6,580,421 | B1 | * | 6/2003 | Leman ........................ 345/168 |
| 6,614,420 | B1 | * | 9/2003 | Han et al. ...................... 345/161 |
| 6,664,946 | B1 | * | 12/2003 | Stipes et al. .................. 345/157 |
| 6,743,100 | B1 | * | 6/2004 | Neiser ............................. 463/37 |
| 6,903,662 | B2 | * | 6/2005 | Rix et al. ........................ 341/22 |
| 7,758,424 | B2 | * | 7/2010 | Riggs et al. ..................... 463/37 |
| 7,794,326 | B2 | * | 9/2010 | Wu et al. ......................... 463/37 |
| 8,493,325 | B2 | * | 7/2013 | See et al. ...................... 345/161 |
| 2005/0277470 | A1 | | 12/2005 | Watanachote |

(Continued)

FOREIGN PATENT DOCUMENTS

EP    1201274 A1    2/2002
EP    1426085 A    9/2004

(Continued)

OTHER PUBLICATIONS

"Notice of Rejection dated Dec. 18, 2012," Korean Application No. 2009-7011909, 7 pages.

(Continued)

*Primary Examiner* — Bach Hoang
(74) *Attorney, Agent, or Firm* — Novak Druce Connolly Bove & Quigg LLP

(57) ABSTRACT

An improved user input device is disclosed having ergonomically-configurable features to custom fit individual users. The arms of the gamepad may be extended from the body of the gamepad, and may be rotated. This may be at user determined angles, or may be set to a predetermined limit. The rotation may be on one or more axes depending on the specific implementation. Similarly, the thumb grooves may be extensible and/or rotatable. Further customization may be provided by modular user input systems.

17 Claims, 3 Drawing Sheets

(56) References Cited

U.S. PATENT DOCUMENTS

| | | |
|---|---|---|
| 2006/0025217 A1* | 2/2006 | Hussaini et al. ............... 463/36 |
| 2008/0284731 A1* | 11/2008 | Mak Pui See et al. ........ 345/161 |
| 2008/0311992 A1* | 12/2008 | Young et al. ................... 463/37 |

FOREIGN PATENT DOCUMENTS

| | | |
|---|---|---|
| EP | 1536614 A1 | 6/2005 |
| JP | 2004-329915 | 11/2004 |
| WO | WO 2004019596 A2 | 4/2004 |
| WO | WO 2005103869 A2 * | 11/2005 |

OTHER PUBLICATIONS

"Office Action dated Mar. 8, 2013," Taiwan Appication No. 096142761, 18 pages.

"Office Action dated May 9, 2014," German Appication No. 112006004113.4, 19 pages.

* cited by examiner

US 9,017,167 B2

ERGONOMICALLY CONFIGURABLE GAME CONTROLLER

FIELD OF THE INVENTION

The present invention relates generally to the field of computer peripherals, and more particularly to user input devices such as gamepad game controllers.

BACKGROUND OF THE INVENTION

Current controllers for game console machines come in many configurations. The most typical is that popularized by the Sony Playstation™, Microsoft Xbox™, Nintendo™ and other related game systems, i.e., the gamepad. In this configuration, the user holds the game controller with two hands, and manipulates the controls with his thumbs and fingers. These controllers are designed to fit as wide a segment of their target audience as possible.

An exemplary prior art gamepad is shown in FIG. 1. Referring to FIG. 1, the controller segments are shown as: body 1; arms 2; and thumb modules 3. The arms contain various buttons, joysticks, mushrooms, trackballs or the like.

Due to the significant deviation in the size and shape of human hands, no controller can fit all users' hands comfortably. Necessarily, this has meant that current gamepad designs are compromises that are not optimized for the needs of all users. It is impracticable to produce large numbers of gamepads of varying sizes.

Thus, it is an object of the present invention to provide a gamepad that is user-customizable and can be optimized for specific users' physical characteristics and preferences.

SUMMARY OF THE INVENTION

An improved user input device is disclosed having ergonomically-configurable features to custom fit individual users.

In accordance of the present invention, rather than being fixed, the arms of the gamepad may rotated. This may be at user determined angles. The degree of freedom of rotation may be set to a predetermined limit (e.g., a default "neutral" angle, and a few other angles that are preset). The rotation may be on one or more axes depending on the specific implementation. The method of achieving this rotation may be via a specially constructed mechanical joint, or a flexible metal tubing acting as a mechanical joint, or some combination thereof.

The arms of the gamepad may be extended from the body of the gamepad. This may be at a user determined distance, or may be set to a predetermined limit (e.g. a default "neutral" distance, and a few other preset distances). The specific method of achieving this extension may be via a specially constructed mechanical telescoping arm. This claim is independent of the implementation method.

The thumb modules, either attached to the arms or to the body, may be rotated in a similar way. The thumb modules, either attached to the arms or to the body, may be extended as well.

In one embodiment, the thumb modules, arms and body may have replaceable buttons or controls to further customize the function of the gamepad (refer to the modular mouse patent as an example of this). For example, instead of an analog stick in the right thumb module, a trackball component may replace it instead.

Any combination of the above, either singly or combined. Thus, the system provides greatly enhanced user customization to the game controller to a great extent for the user's own comfort and convenience.

BRIEF DESCRIPTION OF THE DRAWINGS

The foregoing and other advantages of the invention will become apparent upon reading the following detailed description and upon reference to the drawings, wherein.

Figure 1:
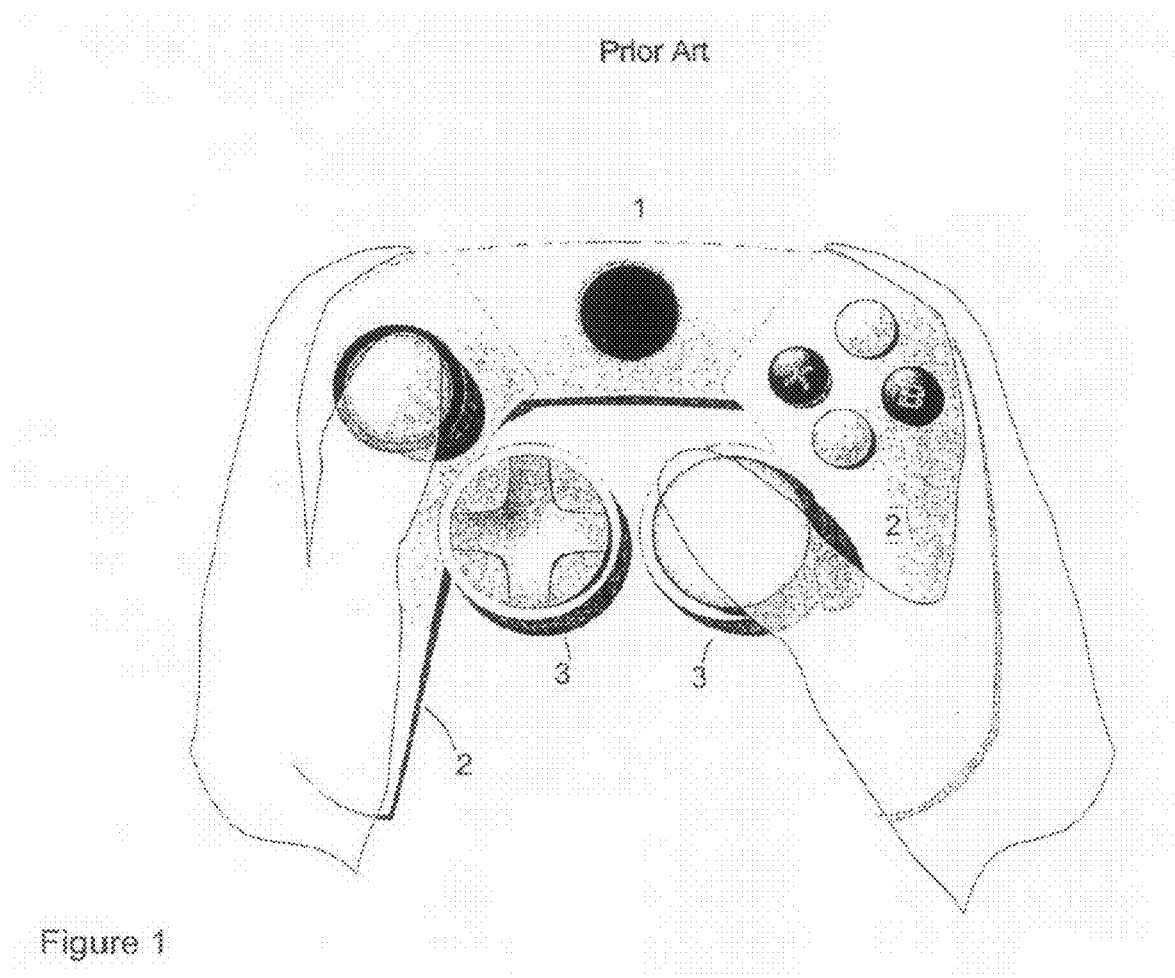
FIG. 1 is a top-down view of a prior art gamepad.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

As summarized above, embodiments of the invention provide a computer input device such as a gamepad having ergonomic benefits and user-customizable geometry.

Customizable Gamepad

Figure 2:
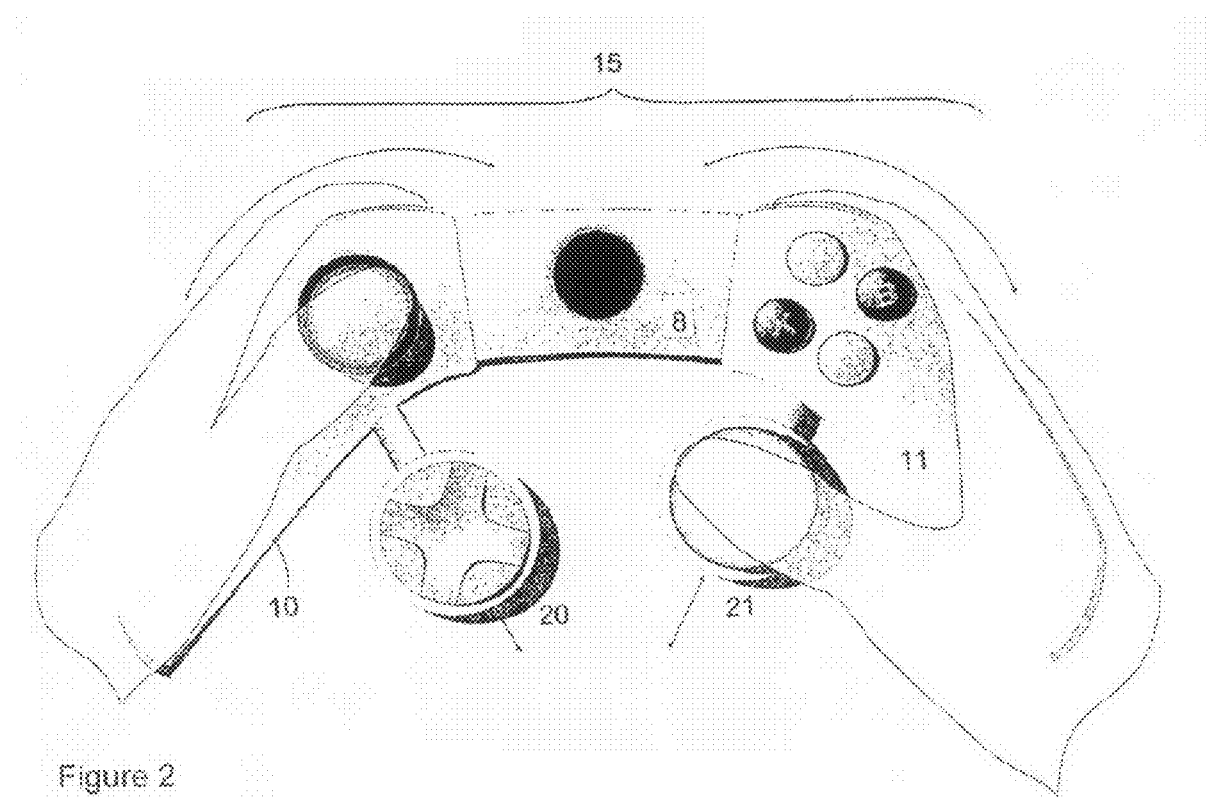
FIG. 2 illustrates a top-down view of a customizable gamepad in accordance with one aspect of the present invention.

Referring to FIG. 2, the arms 10, 11 of the gamepad 15 may be rotated from the body 8 of the gamepad. This may be at wholly user determined angles, or may be set to a predetermined limit (e.g., a default "neutral" angle, and a few other angles that are preset). The rotation may be on one or more axes depending on the specific implementation.

The rotation may be enabled in several ways. For example, the rotation may be accomplished via a specially constructed mechanical joint, or a flexible metal tubing acting as a mechanical joint, or some combination thereof.

The arms 10, 11 of the gamepad may be extended from the body 8 of the gamepad. This may be at a user determined distance, or may be set to a predetermined limit (e.g. a default "neutral" distance, and a few other preset distances). The specific method of achieving this extension may be via a specially constructed mechanical telescoping arm. This claim is independent of the implementation method.

Figure 3:
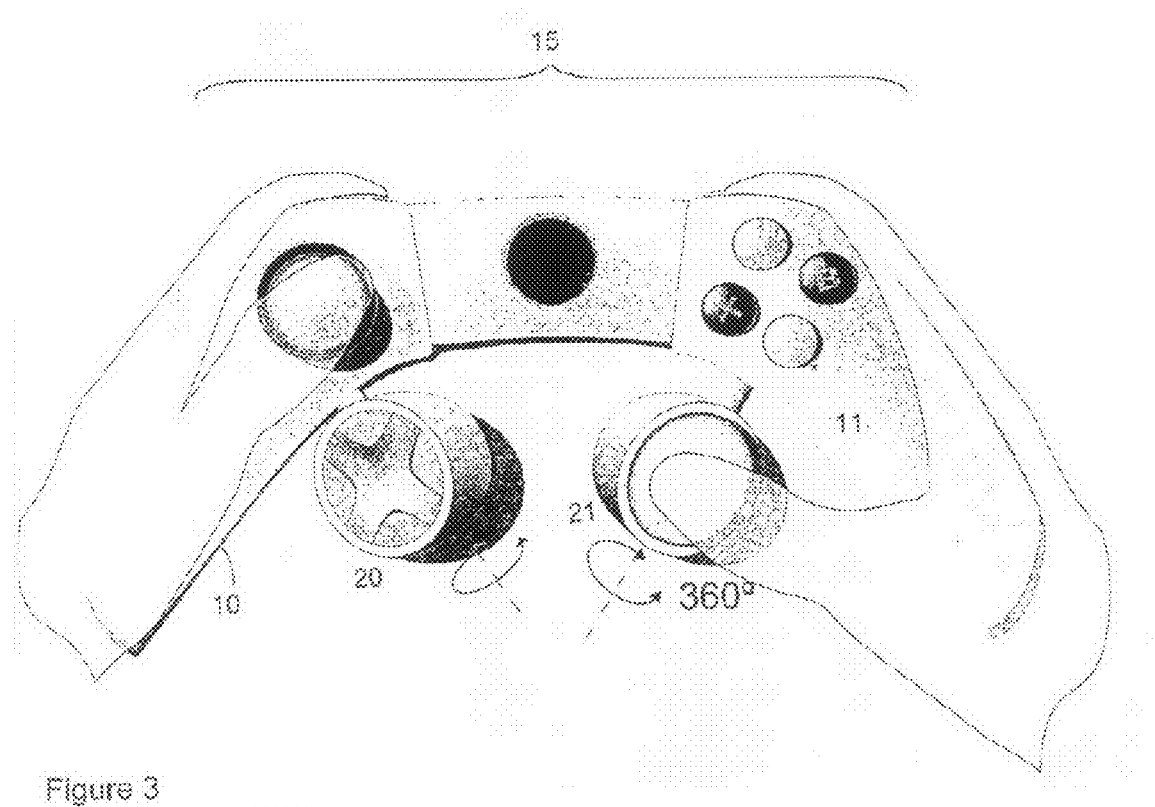
FIG. 3 illustrates a top-down view of a customizable gamepad having rotatable thumb modules in accordance with another aspect of the present invention.

The thumb modules 20, 21, either attached to the arms 10, 11 or to the body 8, may be rotated in a way similar to that discussed in conjunction with the arms 10, 11. More specifically, thumb modules 20, 21 may be rotatable at the discretion of the user. The rotation may be mechanically limited by the joint. Alternatively, a 360° rotation may be provided, as indicated in FIG. 3.

In addition, to enhance customizability, the thumb modules 20, 21 may be extended. The modules may be attached either to the arms 10, 11 or to the body.

The thumb modules 20, 21, arms and body may have replaceable buttons or controls to further customize the function of the gamepad.

Modular System

An improved user input device in accordance with this aspect of the invention could utilize a modular system. In the example of a rumblepad, the thumb modules or arms can be modular. The most expensive components may be collected in a core module. This core module can house the sensor, microcontroller and RF modules, if any. It may also house microswitches that can be actuated when using the external case. A specially adapted connector is utilized to allow the core module to accept mouse button inputs from an interchangeable case, power from a battery pack (if required for wireless operation) and control lights or any other input/output features.

The modular approach enables thus users to use a single base system, and then mix and match with inexpensive modules to suit their individual preferences, or for a user to use the same base system with wireless modules (e.g., keeping the same familiar shape and using one or the other depending on user requirements).

In this way, instead of an analog stick in the right thumb module 21, a trackball component may replace it instead. Any combination of the above, either singly or combined, may also be employed.

Note that aspects of the above invention can be beneficially applied to other user input devices, including rumble pads, control pads and joypads. Thus, while the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An input device adapted to customization by a user comprising:
    a device body;
    a plurality of arms replaceably attached to said body and projecting therefrom, each of the plurality of arms configured to carry at least one replaceable user input button, each of the plurality of arms being at least one of rotatable and extendable about at least one first axis relative to the device body; and
    a first thumb module and a second thumb module replaceably attached to one of the device body or one arm of the plurality of arms, each of the first thumb module and the second thumb module configured to carry at least one replaceable user input control,
    wherein each of the first thumb module and the second thumb module, and its corresponding at least one replaceable user input control carried thereby, is configured for at least one of translational motion and rotational motion;
    wherein each of the first thumb module and the second thumb module is adapted to be extendable in a direction away from the device body and the one arm of the plurality of arms to which the first thumb module or the second thumb module is coupled; and
    wherein each of the first thumb module and the second thumb module and its corresponding at least one replaceable user input control carried thereby, is rotatable about a second axis along which the thumb module is extendable away from the one of the device body and the one arm of the plurality of arms to which the thumb module is coupled.

2. The input device of claim 1, wherein each arm of said plurality of arms is adapted to be rotatable in an arc.

3. The input device of claim 2, further comprising a stop to prevent rotation of at least one of said plurality of arms in accordance with a selection of said user.

4. The input device of claim 1, wherein said the plurality of arms comprises a left arm and a right arm replaceably coupled to a left side and a right side respectively of the device body, and wherein the first thumb module and the second thumb module comprises a left thumb module and a right thumb module replaceably coupled to the left arm and the right arm respectively, the left thumb module and right thumb module configured to be accessible by a left thumb and a right thumb respectively of the user.

5. The input device of claim 1, wherein the at least one replaceable user input control comprises one of a plurality of types of user input components and a plurality of types of user input subsystems.

6. The input device of claim 5, wherein one of said user input components is a trackball.

7. The input device of claim 5, wherein one of said user input components is a button.

8. The input device of claim 1, wherein said input device is a rumblepad.

9. A rumble pad adapted to customization by a user comprising:
    a device body;
    a plurality of arms replaceably connected to and projecting from the device body, each arm of the plurality of arms configured for receiving a first set of replaceable user inputs and being at least one of the rotatable and extendable about at least one first axis relative to the device body; and
    a first thumb module and a second thumb module, each of the first thumb module and the second thumb module replaceably coupled to one arm of the plurality of arms and configured to carry at least one replaceable user input control,
    wherein each of the first thumb module and the second thumb module, and its corresponding at least one replaceable user input control carried thereby, are configured for at least one of rotational motion and translation motion;
    wherein each of the first thumb module and the second thumb module is adapted to be extendable in a direction away from the one arm of the plurality of arms to which the first thumb module or the second thumb module is coupled; and
    wherein each of the first thumb module and the second thumb module, and its corresponding at least one replaceable user input control carried thereby, is rotatable about a second axis along which the thumb module is extendable away from the arm to which the thumb module is coupled.

10. The rumble pad of claim 9, further comprising a plurality of stops to prevent rotation of at least one thumb module of the first thumb module and the second thumb module in accordance with a selection of said user.

11. The rumble pad of claim 9, wherein said first set of user inputs can be replaced by said user with a second set of user inputs.

12. The rumble pad of claim 11, wherein said replacement is accomplished by removing a first user input subsystem from the first thumb module and the second thumb module and replacing it with a second user input subsystem.

13. The rumble pad of claim 9, wherein said plurality of arms comprises a left arm and a right arm coupled and projecting from a left side and a right side respectively of the device body.

14. The rumble pad of claim 9, further comprising a plurality of stops to prevent rotation of the plurality of arms in accordance with a selection of said user.

15. The rumble pad of claim 9, wherein plurality of arms comprises a left arm and a right arm coupled to a left side and a right side respectively of the device body, and wherein the first thumb module and the second thumb module comprises a left thumb module and a right thumb module coupled to the left arm and the right arm respectively for enabling access by a left thumb and a right thumb respectively of the user.

16. The rumble pad of claim 13, wherein the first thumb module and the second thumb module comprises a left thumb module and a right thumb module coupled to the left arm and the right arm respectively for enabling access by a left thumb and a right thumb respectively of the user.

17. An input device comprising:
a device body;
a left arm replaceably coupled to a left side of the device body and configured to carry at least one user input left button;
a right arm replaceably coupled to a right side of the device body and configured to carry at least one user input right button; and
a thumb module configured to carry at least one replaceable user input control, the thumb module replaceably coupled to one of the device body, the left arm, and the right arm, and extendable in a direction along a first axis away from said one of the device body, the left arm, and the right arm; and
wherein the thumb module and the at least one replaceable user input control carried thereby are rotatable about the first axis along which said thumb module is extendable from said one of the device body, the left arm, and the right arm.

* * * * *